United States Patent [19]
Grisley

[11] Patent Number: 5,829,577
[45] Date of Patent: Nov. 3, 1998

[54] METHOD OF RETROFITTING AN IDLER CONVEYOR SYSTEM WITH A V-SHAPED AIR PLENUM AND A V-SHAPED AIR PLENUM CONVEYOR

[75] Inventor: Paul R. Grisley, Denver, Colo.

[73] Assignee: Grisley, Inc., Salt Lake City, Utah

[21] Appl. No.: 647,870

[22] Filed: May 3, 1996

[51] Int. Cl.$^6$ .................................................. B65G 15/60
[52] U.S. Cl. ............................................................ 198/811
[58] Field of Search .................................. 198/811, 818, 198/820, 821, 822

[56] References Cited

U.S. PATENT DOCUMENTS

| | | | |
|---|---|---|---|
| 3,627,111 | 12/1971 | Hillinger | 198/184 |
| 3,734,271 | 5/1973 | Dolgolenko et al. | 198/184 |
| 3,889,802 | 6/1975 | Jonkers | 198/184 |
| 4,185,736 | 1/1980 | Jonkers | 198/811 |
| 4,289,230 | 9/1981 | McGee | 198/811 |
| 4,489,825 | 12/1984 | Gladish | 198/811 |
| 4,984,681 | 1/1991 | Jonkers | 198/811 |
| 5,396,071 | 3/1995 | Atwell et al. | 250/358.1 |

FOREIGN PATENT DOCUMENTS

| | | | |
|---|---|---|---|
| 1166086 | 3/1964 | Germany | 198/811 |
| 3527763 | 2/1987 | Germany | 198/811 |
| 698866 | 11/1979 | U.S.S.R. | 47/47 |
| 1055701A | 11/1983 | U.S.S.R. | 15/28 |
| 1270234 | 4/1972 | United Kingdom | 198/811 |

OTHER PUBLICATIONS

General Types of Belt Conveyor Idlers, pp. 57–70.

Troughed Belt Idlers 35° equal length rolls, pp. 24–25.

*Primary Examiner*—James R. Bidwell
*Attorney, Agent, or Firm*—Madson & Metcalf

[57] ABSTRACT

A method of retrofitting the idler assemblies of an idler conveyor with an air plenum is shown. The method includes the steps of detaching the belt and removing a preselected number of idler assemblies from an existing frame of the idler conveyor. A number of bracket pairs are attached to the frame and an air plenum is attached to the brackets. An air source is attached to the plenum and the belt is reattached. An air plenum conveyor is also shown which includes a frame with a number of bracket pairs attached at spaced intervals along the frame. A V-shaped plenum is secured to the brackets. An air source is attached to the plenum to permit a continuous belt positioned about the plenum to be support by the plenum.

48 Claims, 6 Drawing Sheets

METHOD OF RETROFITTING AN IDLER CONVEYOR SYSTEM WITH A V-SHAPED AIR PLENUM AND A V-SHAPED AIR PLENUM CONVEYOR

BACKGROUND

1. The Field of the Invention

The present invention is related to a method of retrofitting an idler conveyor with an air plenum. More particularly, the present invention is related to a method of retrofitting the idler assemblies of an idler conveyor with an air plenum and also to the resulting apparatus.

2. Technical Background

Materials of all kinds have been conveyed by idler conveyors for decades. Idler conveyors come in a variety of sizes and configurations and can be adapted for use in various situations over various terrain. Idler conveyors can be troughed or flat and often span distances of over one thousand feet. Regardless of the type or use of the idler conveyor all idler conveyors have certain things in common. Idler conveyors typically have a plurality of idler assemblies attached to a frame or base of some kind. Idler assemblies usually consist of between one and three rolls attached to a base. For troughed idlers, there are usually three rolls with the two outer rolls positioned at an incline. Each roll usually has a pair of ringed bearings.

The idler conveying industry has promulgated standards for every aspect of idler conveying including braking, belt tension, assembly idler spacing, and bolt pattern configurations for mounting the idler assemblies to a frame. The recognized body for maintaining standards for the idler conveyor industry is the Conveyor Equipment Manufacturers Association or "CEMA". See Belt Conveyors for Bulk Materials, CEMA Fourth Edition, 1994 incorporated herein by reference. One generally recognized standard is that idler assemblies be positioned at approximately three foot intervals. Given that a single idler assembly may have as many as six bearings, an idler conveyor may have thousands of bearings. This increases the chance that the idler conveyor will need repair or maintenance. Additionally, each idler assembly can weigh upwards of ninety pounds. Thus, idler conveyors require a large support structure which may be expensive to build and to maintain. Additionally, the amount of contact between the belt and each roll of each idler assembly significantly increases belt wear and maintenance costs. This is especially true for troughing idlers with angle rolls that may pinch the belt.

With the advent of computer controlled manufacturing processes, air conveyors have been utilized to a certain degree in the idler conveying industry. Air conveyors have virtually no moving parts, require less support structure, and dramatically reduce friction wear on the belt. Air conveyors have not, however, been widely accepted by the industry. This may be due in part to several limitations suffered by conventional air plenums. Foremost among these is cost. For example, many conventional air plenums are not configured to be used with the existing frame of an idler conveyor, thus forcing the owner of an idler conveyor system to replace most, if not all, of the idler conveyor system in order to utilize an air plenum. This, of course, could be cost prohibitive.

Other air plenum conveyors, even if they can be used on an existing idler conveyor frame, cannot be used in combination with the existing idler assemblies because of a difference in the size of the support trough and/or the location of the support trough relative to the frame. Thus, these air plenums cannot be used to replace even a portion of the existing idler conveyor and cannot take advantage of any of the existing and desirable features of the idler conveyor system. For example, it may be advantageous to retain the idler assemblies at the receiving portion of the belt or at the ends of the conveyor.

Other air plenum conveyors have relatively complex plenum configurations which require costly manufacturing procedures. These air plenums also require more material which increases the cost. These plenum configurations are also heavier and are often less stable requiring additional supports to span greater distances. This also adds to the overall cost of conventional air plenum conveyors.

From the foregoing, it will be appreciated that it would be an advantage over the art to provide a method of retrofitting the idler assemblies of an existing idler conveyor with an air plenum that can utilize the existing structure of an idler conveyor. It would be an additional advantage if the air plenum were constructed to facilitate the combination of the air plenum with the existing idler assemblies. It would be another advantage if the air plenum could be constructed with a minimum of material and could span greater distances with increased stability. It would also be an advantage to have an air conveyor which incorporates a stable plenum and that could span greater distances while increasing cost effectiveness.

Such a method for retrofitting the idler assemblies of idler conveyor with an air plenum is disclosed and claimed herein. Such an air plenum conveyor is also disclosed and claimed herein.

BRIEF SUMMARY OF THE INVENTION

The present invention is directed to a novel method for retrofitting the idler assemblies of an idler conveyor with a novel air plenum. The idler assemblies to be retrofitted are mounted to a frame. Each idler assembly has at least one roll and usually three rolls, including a pair of angled end rolls, which define a support trough in which the load bearing portion of a continuous belt rides. The rolls are attached to a base which has a pair of mounting notches for securing the base to a frame.

The first step in the retrofit method is to determine the number of idler assemblies to be retrofitted with an air plenum. Then the information pertaining to the existing idler conveyor that is needed to determine the industry standards to be approximated by the air plenum is identified. This information includes the width of the belt used with the idler assemblies, the angle of the end rolls of the idler assemblies, the CEMA idler classification for the idler assemblies, and whether the idler assemblies to be retrofitted include a wide base or a standard base.

With this information, the width and depth of the trough and the position of the trough relative to the frame can be determined for the particular type of idler assembly to be retrofitted. Additionally, the desired dimension for the distance between the mounting notches configured within the base of each idler assembly to be retrofitted can be determined. These dimensions can then be used to manufacture an air plenum and support brackets that will conform to industry standards for the removed idler assemblies. Thus retrofitting can be done with improved cost-effectiveness.

With the desired dimensions which conform to industry standards for the type of idler assemblies to be retrofitted, the novel air plenum and support brackets can be manufactured. The plenum is made up of plenum sections attached end-to-end. Each plenum section includes an air support surface sealed to a bottom member. In a preferred embodiment, the bottom member is V-shaped. The air support surface is configured with a plurality of openings to permit air passing through the plenum section to escape through the air support surface. This V-shaped plenum can be made using the simplest of manufacturing processes and requires less material to manufacture that conventional air plenums. Additionally, its construction is more stable and it is lighter which allows the air plenum to span a greater distance using less support brackets.

Each bracket is configured to attach to a first and a second side of the frame and to engage a surface of the bottom member. The brackets are configured with mounting notches that approximate the mounting notches in the base. Thus, the means of attachment used to attach the idler assemblies to the frame may also be used to attach the brackets to the frame.

The plenum and brackets are configured such that when the plenum is attached to the brackets, the belt, when positioned adjacent the parabolic air support surface, travels along substantially the same belt line relative to the frame as the belt traveled when supported by the removed idler assemblies.

Accordingly, the air plenum can attach to the existing structure of the idler conveyor and can be used in combination with existing idler assemblies because the air support surface approximates the trough defined by the rolls of the idler assemblies and because the plenum maintains the same belt line as supported by the idler assemblies.

To replace the desired idler assemblies with an air plenum, the belt is detached and the preselected number of idler assemblies are removed from the frame. A number of bracket pairs are attached to the frame with one of each pair of brackets attached to opposing sides of the frame. In one embodiment each pair of brackets is spaced along the frame at an interval of between about 10 feet and about 60 feet. In a preferred embodiment, the bracket pairs are spaced along the frame at an interval of between about 30 feet and about 45 feet. In the presently preferred method, the brackets are attached to the frame using the means of attachment used to attach the idler assemblies to the frame. For example, most idler assemblies are bolted to the frame. Because of the novel bracket configuration the brackets can be bolted into the same holes left vacant by the removed idler assemblies using the same bolts.

In one presently preferred embodiment, the plenum sections are preassembled into a plenum subsection before being attached to the brackets. Each plenum section is attached end-to-end to an adjacent plenum section. The seam created between adjacent plenum sections is preferably air tight. Each preassembled plenum subsection is then secured to the brackets. In one embodiment the securing step is accomplished by drilling holes into the plenum subsection such that each hole is aligned with a hole in one of the brackets. A fastener is then threaded into the holes. In a preferred embodiment, a sleeve is inserted into each hole in the plenum subsection. The sleeve is threaded for receiving a fastener. As the fastener is threaded into the bracket hole and into the sleeve, the sleeve collapses around the hole sealing it.

The preassembling of plenum sections into plenum subsections and the securing of plenum subsections to the brackets is repeated until the length of the idler conveyor corresponding to the number of idler assemblies to be retrofitted has been spanned by an air plenum. Each end of the plenum is then capped and an air source is attached to the plenum. Finally, the continuous belt is reattached with a portion of the continuous belt supported by the air plenum.

The present invention is also directed to a novel air conveyor. The conveyor includes a frame with a number of bracket pairs attached to the frame at spaced intervals. In one embodiment, the bracket pairs are spaced at intervals of between about 10 feet and about 60 feet along the frame. In a preferred embodiment, the brackets are spaced at intervals of about 30 and 45 feet along the frame.

Each bracket is configured with a base member for attaching the bracket to the frame. The base member includes a pair of spaced mounting notches disposed within a first edge and a second edge opposite the first edge of the base member. Each bracket also includes an upright member attached to the base member extending upwardly away from the base member. A plenum support member angles downwardly from the upright member toward the center of the frame with a gusset affixed between the upright member and the support member to maintain the angle between the two.

The conveyor also includes an air plenum secured to the brackets. The plenum is made from attaching a number of plenum sections end-to-end. The plenum is configured with a V-shaped bottom member and a parabolic air support surface. The parabolic air support surface is positioned within an open end of the V-shaped bottom member. The parabolic air support surface also includes a number of openings to permit air passing through the plenum to escape through the air support surface. This escaping air forms an air cushion on which a continuous belt may be supported.

The conveyor includes side flanges for attaching a cover to the plenum. The side flanges extend from each edge of the air support surface away from the open end of the bottom member of the plenum.

The conveyor also includes an air source secured to the plenum and a continuous belt is positioned about the plenum.

Accordingly, the present invention provides a method of retrofitting the idler assemblies of an existing idler conveyor with an air plenum that can utilize the existing structure of an idler conveyor. The air plenum is constructed to facilitate the combination of the air plenum with the existing idler assemblies. The present invention also provides an air plenum that is manufactured with a minimum of material and is cost effective to produce. The present invention also provides a plenum with increased stability and spanning capability.

These and other advantages of the present invention will become more fully apparent by examination of the following description of the preferred embodiments and the accompanying drawings.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

Figure 1:
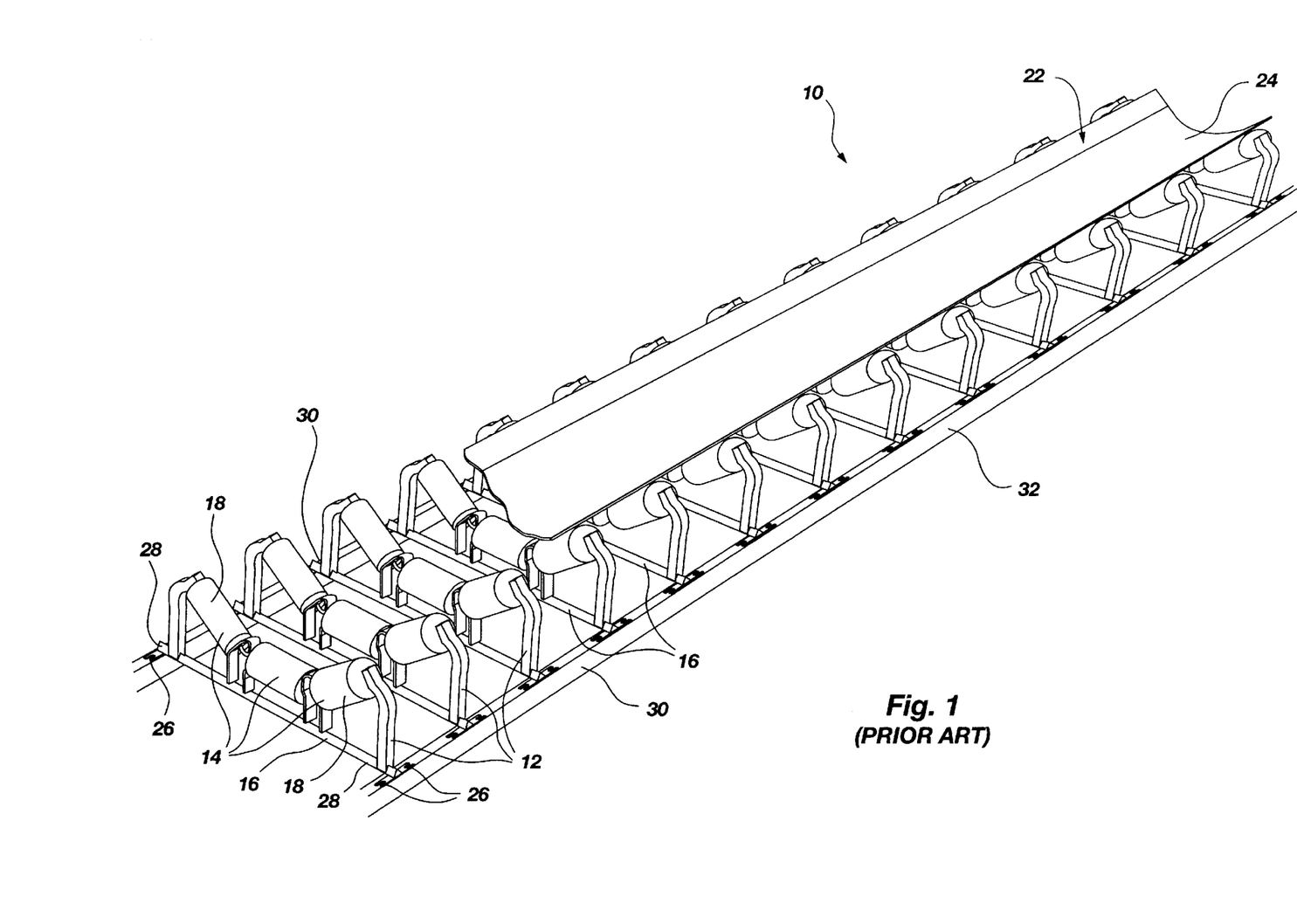
FIG. 1 is a partially cut away perspective view of a prior art idler conveyor.

Reference is now made to the figures wherein like parts are referred to by like numerals throughout. With particular reference to FIG. 1, a conventional idler conveyor is shown according to the prior art and is generally designated at 10.

The idler conveyor 10 is configured with a plurality of idler assemblies 12. Each idler assembly 12 has a plurality of rolls 14 attached to a base 16 including a pair of angled end rolls 18. Each roll 14 of each idler assembly is configured with a contact side 15 (FIG. 2) for supporting the belt 24, the contact sides 15 of the rolls 14 in the idler assemblies 12 define a trough 20 (FIG. 2) in which a load bearing portion 22 of a belt 24 rides when the idler conveyor 10 is in operation. The base 16 is configured with a pair of mounting notches 26 disposed within a first end and a second end (both designated 28) of the base 16. The notches 26 facilitate the mounting of each idler assembly to first side and a second side opposite the first side (both sides designated 30) of a frame 32. It will be appreciated by those with skill in the art that the method of the present invention could be used to retrofit an idler assembly with a single flat roll 14.

The present invention pertains to a method of retrofitting the idler assemblies 12 of an idler conveyor 10 as shown in FIG. 1 with an air plenum. As will be discussed in more detail below, the air plenum consists of a number of plenum sections attached end-to-end.

The first step in the method of retrofitting the idler assemblies 12 of an idler conveyor is to determine the number of idler assemblies 12 to be replaced and thus, the corresponding length of the idler conveyor 10 to be retrofitted with the air plenum. It will be appreciated by those with skill in the art that all of the idler assemblies 12 of the idler conveyor 10 need not be retrofitted to accomplish the teachings of this invention. For example, it may be desirable to leave a plurality of idler assemblies 12 attached to the frame 32 at a point where material is loaded onto the belt 24. It may also be desirable to manufacture the air plenum in sections. Thus, if the air plenum is manufactured in ten foot sections and the length of the idler conveyor 10 is ninety three feet, it may be desirable to retrofit ninety feet of idler assemblies 12 with an air plenum and leave three feet of idler assemblies 12 in place. As will be further discussed below, the ability to combine the air plenum with the idler assemblies 12 is due in large part because the air plenum and support brackets are configured such that the loading bearing portion 22 of the belt 24 travels along the same belt line when supported by the air plenum as it does when supported by the idler assemblies 12.

The next step in the method of retrofitting the idler assemblies 12 of an idler conveyor 10 with an air plenum is to identify the width of the belt 24 used with the idler assemblies 12 to be retrofitted, identify the angle θ of the end rolls 18 of the idler assemblies 12 to be retrofitted, identify the CEMA idler classification for the idler assemblies 12 to be retrofitted, and identify whether the idler assemblies 12 to be retrofitted include a wide base or a standard base. From this information, the desired dimensions conforming to industry standards for the identified type of idler can be determined by reference to a table of standards. This information can then be used to manufacture plenums and brackets which approximate those standards.

Those with skill in the art of idler conveyors will appreciate that in the idler conveyor industry, belt widths typically range from 18 inches to 96 inches at six inch increments between 18 inches and 60 inches, and at twelve inch increments between 60 inches and 96 inches. Those with skill in the idler conveyor art will also appreciate that end roll angles generally range from 0 degrees up to 45 degrees with the majority of end roll angles being 0 degrees, 20 degrees, 35 degrees, and 45 degrees. Additionally, the CEMA idler classifications for idler assemblies are as follows:

| Idler Classification | | | |
| --- | --- | --- | --- |
| Classification | Former series no. | Roll diameter (inches) | Description |
| A4 | I | 4 | Light duty |
| A5 | I | 5 | Light duty |
| B4 | II | 4 | Light duty |
| B5 | II | 5 | Light duty |
| C4 | III | 4 | Medium duty |
| C5 | III | 5 | Medium duty |
| C6 | IV | 6 | Medium duty |
| D5 | NA | 5 | Medium duty |
| D6 | NA | 6 | Medium duty |
| E6 | V | 6 | Heavy duty |
| E7 | VI | 7 | Heavy duty |

The belt width, end roll angle, idler assembly classification, and type of base can be identified by consulting the owner's guide to the idler assembly 12 to be retrofitted. Given this information, the desired dimensions for the trough 20 and the position of the trough 20 (FIG. 2) relative to the frame 32 can be determined. These dimensions represent the industry standard for the type of idler assemblies 12 identified in the previous step. Additionally, the desired dimension for the distance between the mounting notches 26 on the first and second ends 28 of the base 16 can be determined. This distance also conforms to industry standards of idler assemblies 12. Accordingly, an air plenum can be manufactured to substantially conform to these standards such that the plenum can be retrofitted into the existing conveyor 10 without the need to entirely replace the existing system 10. Further, support brackets for the plenum can be manufactured that will engage the air plenum and bolt into the holes left vacant by the removed idler assemblies 12. Various brackets for a variety of standard trough configurations could also be inventoried further reducing retrofit costs. Thus, the method of the present invention allows for maximum cost savings in replacing the idler assemblies 12 with an air plenum.

The next step in the method of retrofitting the idler assemblies 12 of an idler conveyor with an air plenum is to determine the desired dimensions for the width and depth of the trough 20 and the position of the trough 20 relative to the frame 24 for the particular type of idler assemblies 12 identified in the identifying step. These standard dimensions can be determined by consulting any one of a number of manufacturer's guides for idler assemblies 12. For example, the following table illustrates a typical manufacturer's guide which shows the standard dimensions for a CEMA C5 idler assembly 12 with an end roll angle of 35 degrees.

35° Troughed Belt Idler
5" Rolls/CEMA C5
Dimensions in inches

| Belt Width | Standard base (Belt width +9") | | | | Wide base (Belt width +15") | | | | |
|---|---|---|---|---|---|---|---|---|---|
| | Idler weight pounds | A | B | C | Idler weight pounds | A | B | C | D |
| 18 | 47  | 27 | 8¼ | 12½  | 50  | 33 | 8¼ | 12½  | 18⅞ |
| 20 | 50  | 29 | 8¼ | 12⅞  | 53  | 35 | 8¼ | 12⅞  | 20¾ |
| 24 | 57  | 33 | 8¼ | 13⅝  | 60  | 39 | 8¼ | 13⅝  | 24⅜ |
| 30 | 62  | 39 | 8⅝ | 15⅛  | 64  | 45 | 8⅝ | 15⅛  | 29⅝ |
| 36 | 69  | 45 | 8⅝ | 16¼  | 71  | 51 | 8⅝ | 16¼  | 35 |
| 42 | 87  | 51 | 9  | 18   | 89  | 57 | 9  | 18   | 41⅛ |
| 48 | 96  | 57 | 9  | 19⅛  | 98  | 63 | 9  | 19⅛  | 46⅜ |
| 54 | 104 | 63 | 9  | 20¾  | 107 | 69 | 9  | 20¾  | 52¾ |
| 60 | 114 | 69 | 9  | 21⅜  | 116 | 75 | 9  | 21⅜  | 57⅛ |

As can be seen from the table, the standard dimensions A, B, C, and D for a idler assembly with CEMA classification "C5" are listed for each belt width and for a standard base and a wide base.

Figure 2:
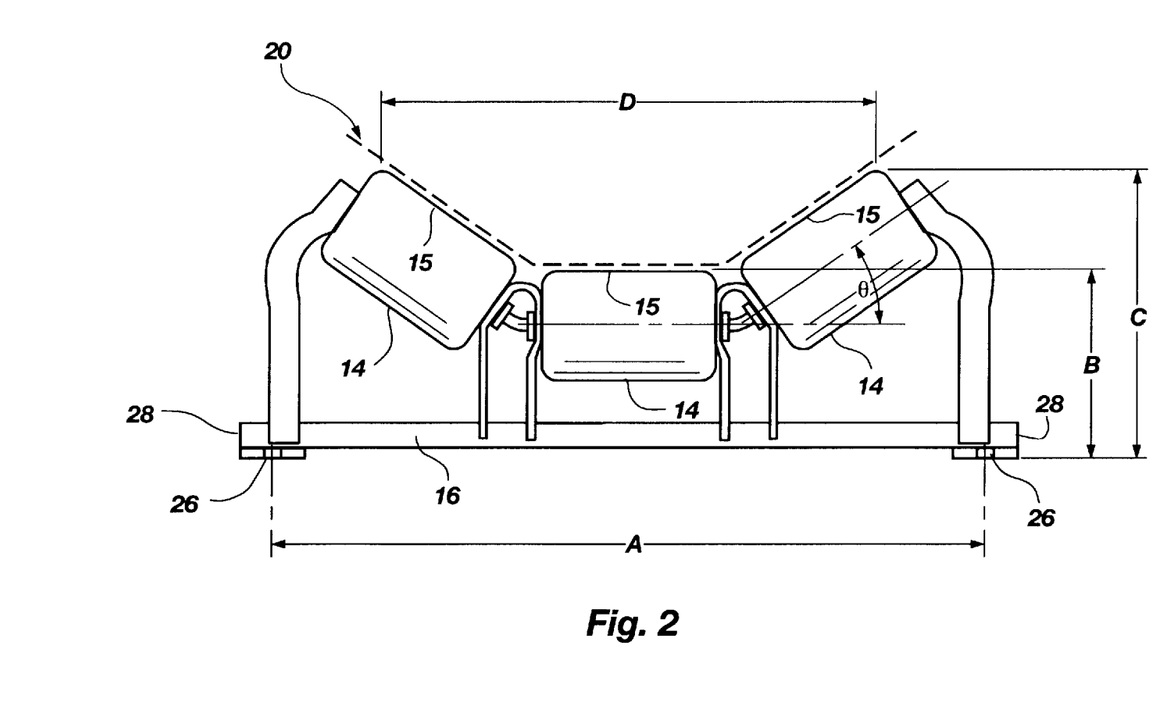
FIG. 2 is a front plan view of the idler assembly of the conveyor illustrated in FIG. 1.

With reference now to FIG. 2, an idler assembly 12 according to the prior art is shown. The dimensions A, B, C, and D shown in FIG. 2 correspond to the dimensions listed in the table above. The width of the trough 20 is D. The depth of the trough 10 can be determined by subtracting B from C. The position of the trough relative to the frame is B.

The next step in the method of retrofitting is to determine the desired dimension for the distance between the mounting notches 26 configured within the base 16 of the idler assemblies 12 identified in the identifying step. In a preferred embodiment this dimension is A, the standard dimension for the idler assemblies to be retrofitted.

Those with skill in the art will appreciate that the identifying step and the determining steps can be accomplished by actually measuring the dimensions of the trough 20, measuring the position of the trough 20 relative to the frame, and measuring the distance between the mounting notches 26 in the base 16 of the existing idler assembly 12 to be retrofitted. However, relying on the standard dimensions A, B, C, and D for the idler assemblies 12 to be retrofitted will often save the time and expense of actual measurement.

Figure 3:
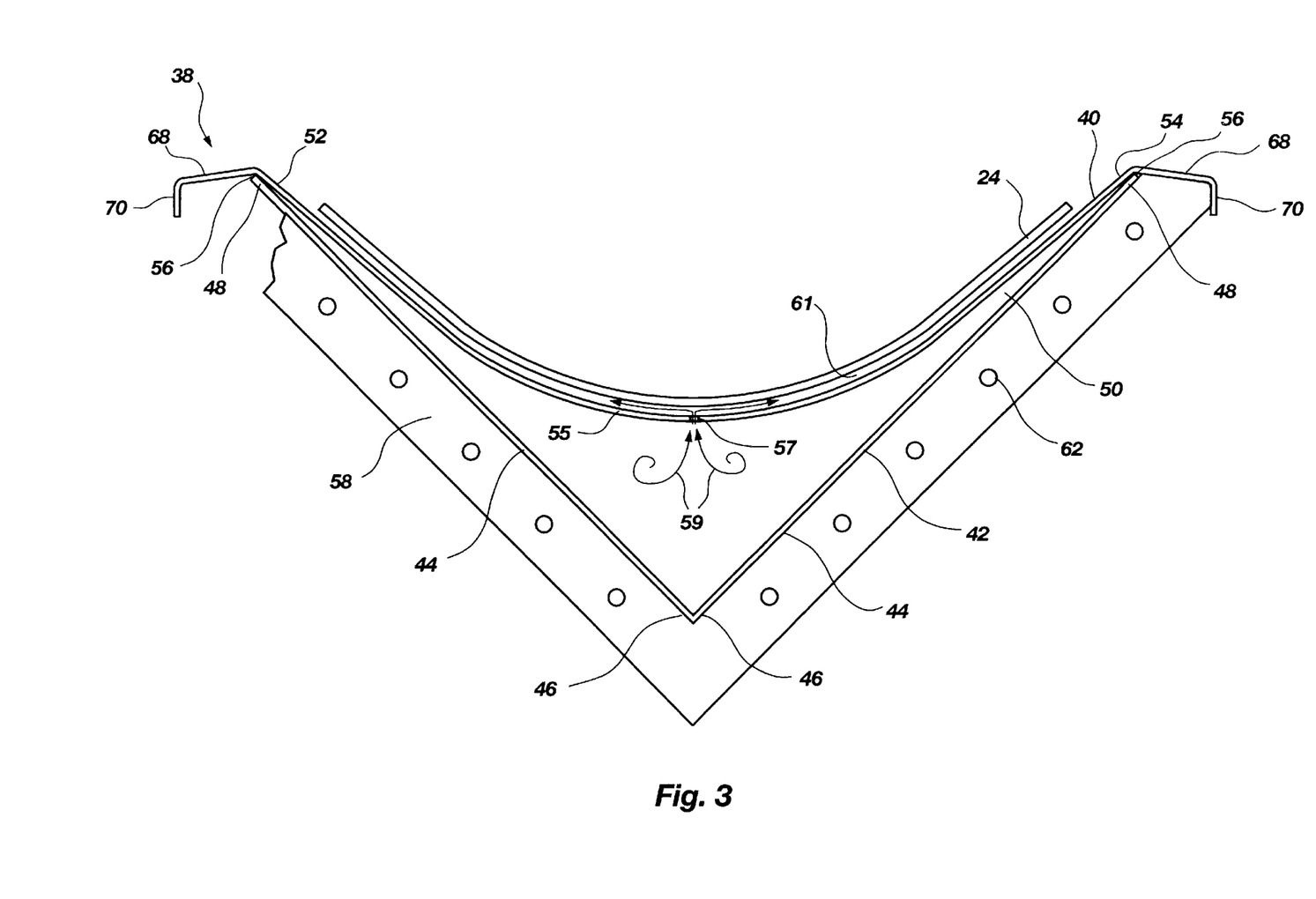
FIG. 3 is a front plan view of the air plenum of the present invention.

With the trough 20 dimensions and position relative to the frame corresponding to the particular idler assemblies 12 to be retrofitted, an air plenum can be manufactured which will approximate the industry standards for the type of idler assemblies to be removed. The air plenum is made up of a plurality of plenum sections 38. Referring to FIG. 3, a plenum section 38 according to the present invention is shown. In a preferred embodiment, each plenum section 38 is configured with an air support surface 40 sealed to a V-shaped bottom member 42. In alternative embodiments, the bottom member 42 can by U-shaped or semi-circular. The V-shaped bottom member is configured with a pair of surfaces 44. Each surface 44 includes a first edge 46 and a second edge 48. The surfaces 44 are attached along the first edge 46 of each surface 48. The second edges 48 of each surface 44 define an open end 50 of the V-shaped bottom member 42.

In a preferred embodiment, the bottom member 42 is configured from one continuous piece of material. The V-shaped bottom member 42 can be made by applying a single press break to the material. Thus, the V-shaped bottom member 42 offers a significant manufacturing cost savings over other plenums that have three or more surfaces and that must be manufactured by applying multiple press breaks to the same material. Additionally, the V-shaped plenum section 38 offers a cost advantage over other plenums in that the V-shaped bottom member 42 requires substantially less material than plenums with multiple surfaces. The width of the material to be made into a V-shaped bottom member 42 need only be slightly wider than the material used to manufacture the air support surface 40. The V-shaped plenum section 38 is also more stable in its construction. The single angle in the V-shaped bottom member 42 prevents the V-shaped plenum section 38 from deforming. Multiple plenum angles are more apt to permit deformation. For example, a square plenum bottom member may shift into a more parallelogramic shape under the weight of the material being conveyed causing an irregularity in the conveying line.

The air support surface 40 is positioned substantially within the open end 50 of the V-shaped bottom member 42. A first edge 52 and a second edge 54 of the air support surface 40 engage the open end 50 of the V-shaped bottom member 42 along the second edge 48 of each surface 44. The edges 52 and 54 are seam welded to each second edge 48 to thereby create a substantially air tight seam 56. Accordingly, each plenum section 38 is substantially hollow allowing air to flow unimpeded through the plenum section 38.

It will be appreciated by those with skill in the art that there are a number of ways to attach the air support surface 40 to the bottom member 42. Of importance is that the seam be substantially air tight such the air flows through the plenum section 38 without escaping through the seam 56. It will also be appreciated by those with skill in the art that the angle of the V-shape of the bottom member 42 is dependent in part upon the width of the parabolic air support surface 40 positioned within the open end 50 of the V-shaped bottom member 42. The angle is also dependent upon the required position of air support surface 40 relative to frame 32 as required to approximate the dimension and position of the trough 20 of the removed idler assemblies 12.

Figure 4:
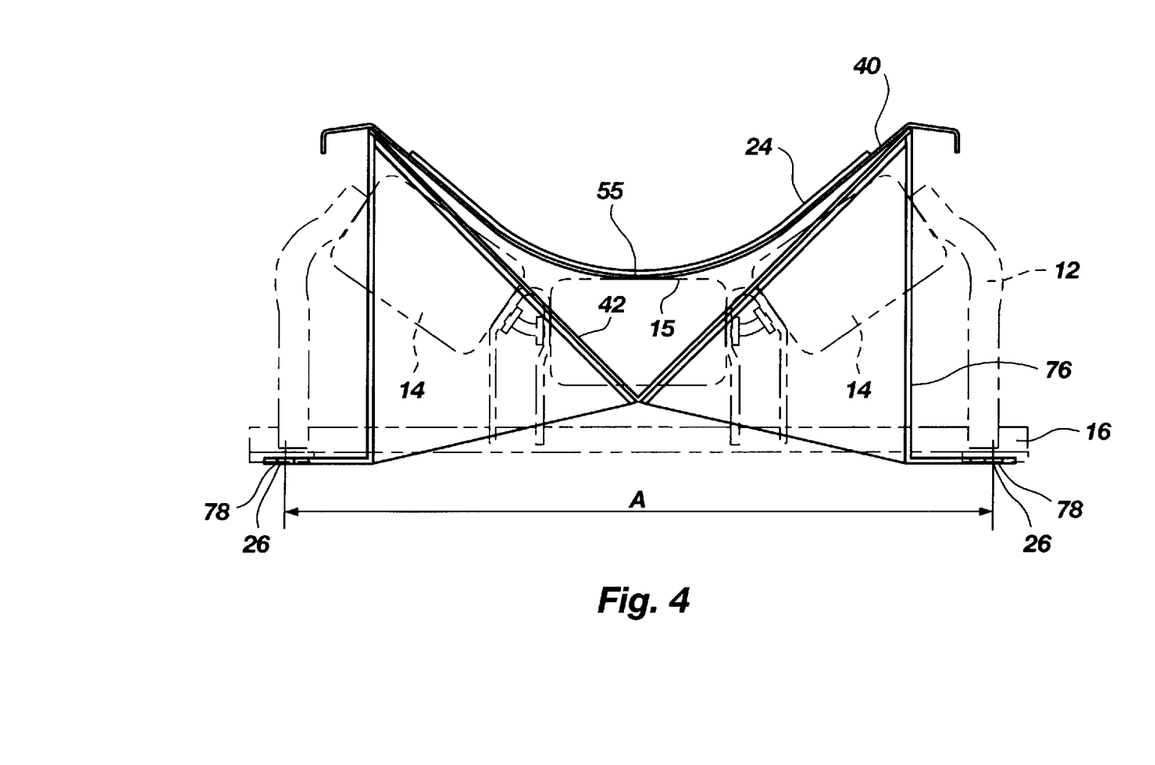
FIG. 4 is a front plan view of the air plenum of FIG. 3 without an end flange.

With reference now to FIG. 4, a plenum section 38 manufactured in the manufacturing step of the present invention is shown. The air support surface 40 is configured to approximate the trough 20 defined by the contact surfaces 15 of the rolls 14 of the idler assemblies 12 to be retrofitted (FIG. 2). Thus, the air support surface 40 is substantially parabolic in shape.

Referring again to FIG. 3, the parabolic air support surface 40 is configured with a plurality of openings 57 (see also FIG. 7) disposed therethrough to thereby permit air 59 passing within each plenum section 38 to escape through the parabolic air support surface 40. In a preferred embodiment, the openings are disposed through a bottom portion 55 of the air support surface 40. The escaping air 59 forms an air cushion 61 adjacent the air support surface 40 on which the belt 24 may ride. One with skill in the art of air dynamics will appreciate that the amount of air flow and the positioning of the holes may be adjusted to accommodate the desired air pressure needed over the length of the plenum for the weight of the material to be conveyed.

Figures 7, 8:
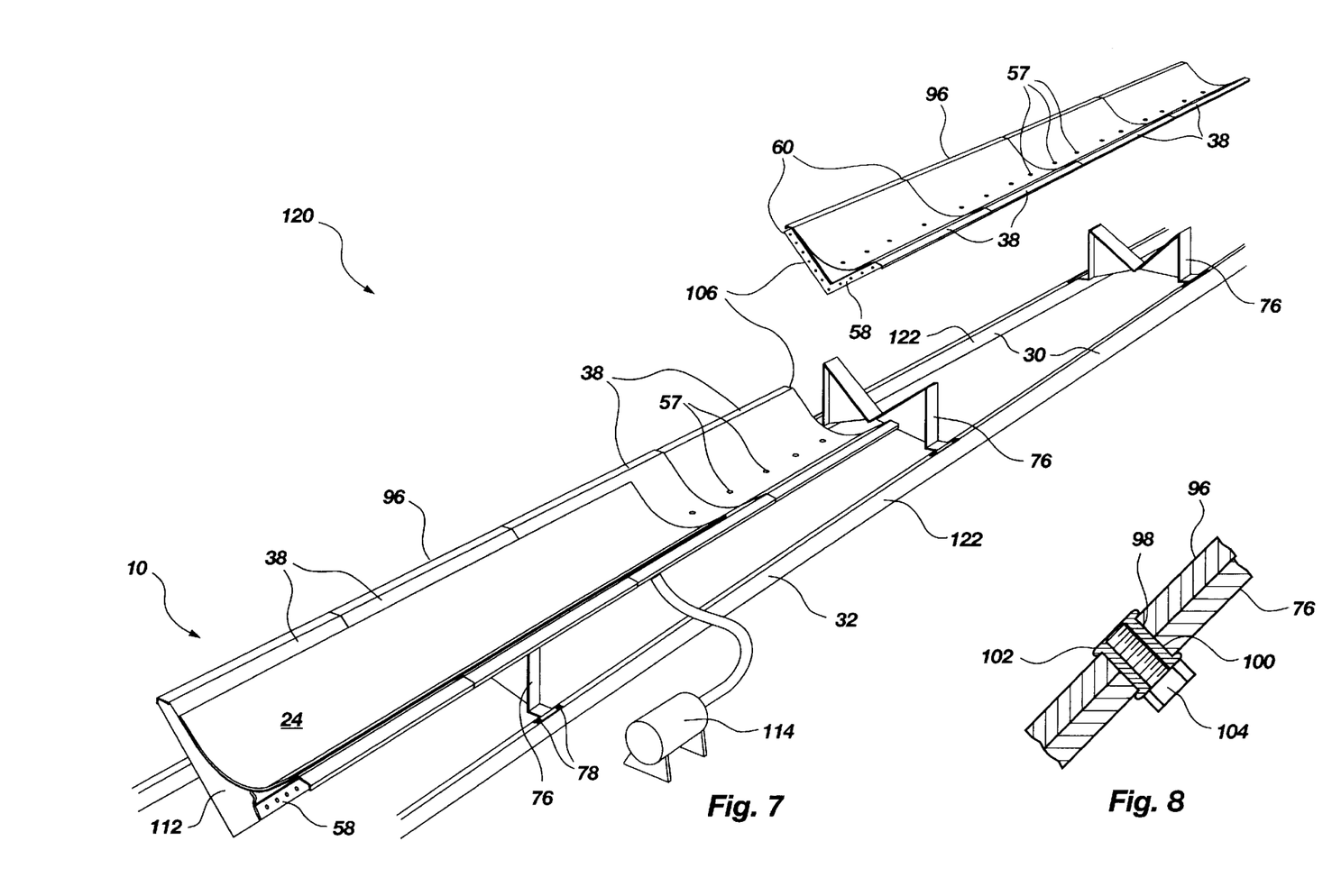
FIG. 7 is perspective view of one embodiment of the air plenum conveyor of the present invention.
FIG. 8 is a front plan view of a fastener sleeve assembly within the scope of the present invention.

An end flange 58 is attached to each end 60 of each plenum section 38 (FIG. 7). As will be discussed more fully below, the end flange 58 facilitates the end-to-end attachment of adjacent plenum sections 38 into a plenum. In one preferred embodiment the end flange 58 is configured to match the shape of the bottom member 42 and is seam welded to the bottom member 42. The end flange 58 in one presently preferred embodiment is angle brace, one and one half inches wide. As will be more fully discussed below, each end flange 58 is configured with a plurality of holes 62 disposed through the end flange such that the end flanges 58 at adjacent ends 60 of adjacent plenum sections 38 may be bolted together. It will be appreciated that a number of end flange 58 configurations could be used to facilitate the end-to-end attachment of plenum sections 38 such that the seam created between adjacent plenum sections 38 is substantially air tight.

The plenum is configured with means for attaching a cover to the plenum. A side flange 68 extends from the first edge 52 of the air support surface 40 and from the second edge 54 of the air support surface 40. The side flanges 68 extend outwardly from the open end 50 of the bottom member 42 on each side of the open end 50. Each side flange 68 is configured with a tab 70 which extends downwardly from the side flange 68. The tab 70 prevents the cover from slipping off the side flange 68. In one preferred embodiment, the air support surface 40, the side flanges 68 extending from each edge 52 and 54 of the air support surface 40, and the tabs 70 of each side flange 68 are one continuous piece of material. The ability to attach a cover offers significant advantages as far as dust control, and invasive and pervasive environmental control. It will be appreciated by those with skill in the art that the side flange 68 need not run the entire length of the plenum section 38 in order to provide a means to attach a cover to the plenum. In alternative embodiments, clips may be attached to the side of each plenum section 38 to provide a surface to which a cover may be bolted or riveted.

In one preferred embodiment, each plenum section is between about 5 feet and about 25 feet in length. In a presently preferred embodiment, each plenum section is between about 8 feet and about 12 feet in length. It will be appreciated by those with skill in the art the length of plenum may be determined by how long the press break is that is used to manufacture the bottom member 42 and the air support surface 40. Many commercial press break are about ten feet long.

In one embodiment, the bottom member 42, the air support surface 40, and the end flange 58 are made of metal. In the preferred embodiment of the present invention, the bottom member 42, the air support surface 40, and the end flange 58 are made of 10 gauge carbon steel, one quarter of one inch thick. It will be appreciated that the bottom member 42, the air support surface 40, and the end flange 58 may be made from a variety of materials including various metals, metal alloys, and composite materials. For example, if the material to be conveyed is a salt compound, a stainless steel plenum may be desirable. The materials may vary for each of these parts, however, it is preferred that the bottom member 42, the air support surface 40, and the end flange 58 are all made from the same material because of the importance of air tight seams and the general principal that similar materials weld together better than nonsimilar materials.

Figure 5:
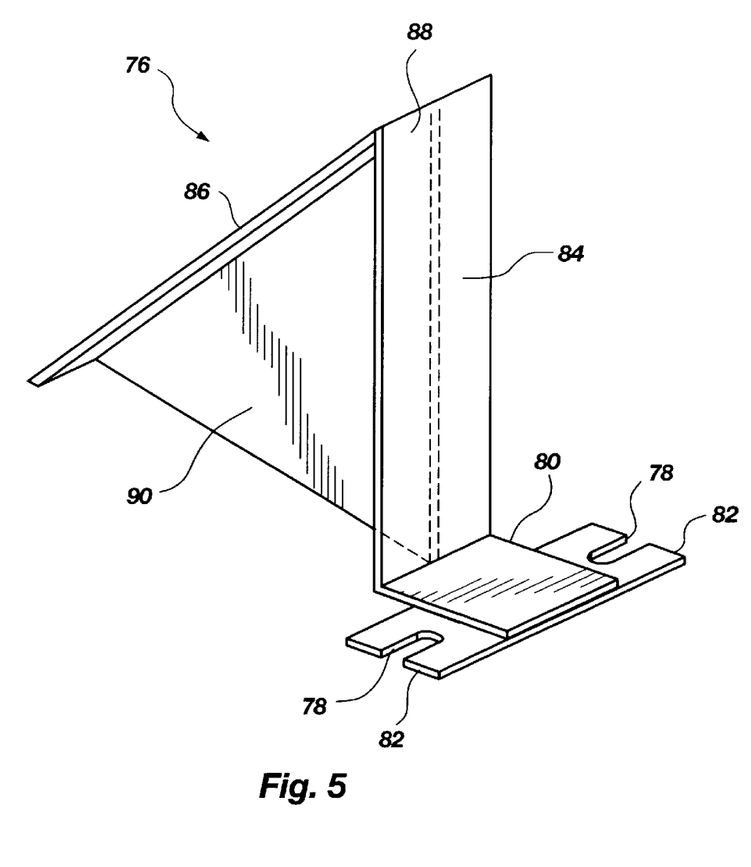
FIG. 5 is perspective view of one embodiment of the support bracket of the present invention.
Figure 6:
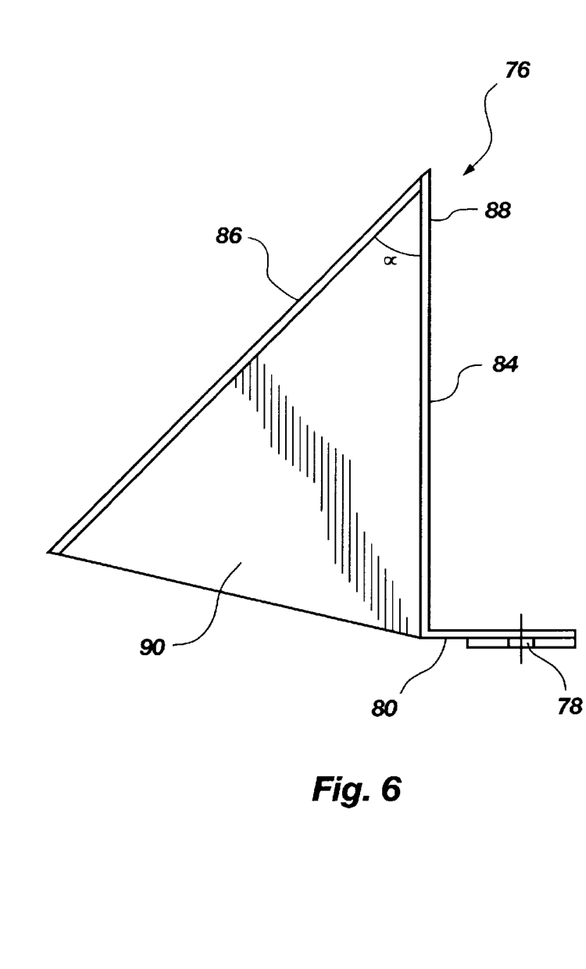
FIG. 6 is a side plan view of the support brackets illustrated in FIG. 5.

The next step in the method of retrofitting idler assemblies 12 of an idler conveyor with an air plenum requires the manufacturing of brackets 76 to support the air plenum to be installed in place of the idler assemblies 12. Each bracket 76 is configured to attach to opposite sides 30 of the frame 32 and to engage a surface 44 of the bottom member 42 (see FIG. 7). Referring now to FIGS. 5 and 6, each bracket 76 is configured with mounting notches 78 conforming to the industry standard for the mounting notches 26 of the base 16. Thus, in one preferred embodiment, the brackets 76 may be attached to the frame 32 using the means of attachment used to attach the idler assemblies 12 to the same frame 32.

Each bracket 76 has a base member 80 for attaching the bracket 76 to the frame 32. At least one mounting notch 78 is disposed within the base member 80. In a presently preferred embodiment, a pair of notches 78 is disposed within opposite edges 82 of the base member 80. The notches 78 are spaced at a distance of between about 5 inches and about 10 inches apart and preferably about 6 inches apart. In a presently preferred embodiment, the notches 78 are each three inches long and eleven sixteenths of an inch wide. These dimensions correspond to industry standards for mounting notches 26 of idler assemblies 12 to facilitate retrofitting.

As can best be seen by reference to FIG. 4 the distance between the mounting notches 78 within any pair of brackets 76 attached to opposite sides 30 of the frame 32 is the same as the distance between the mounting notches 26 of the base 16, namely A. This configuration of brackets 76 offers a substantial cost savings because the same bolts and bolt holes used to secure the idler assemblies 12 to be retrofitted to the frame 32 can be used to secure the brackets 76 to the frame 32. Thus, additional holes do not have to be drilled into the frame and additional fasteners or bolts do not have to be purchased.

In one presently preferred embodiment, each bracket 76 is configured with an upright member 84 attached to the base member 80 and extending upwardly away from the base member 80 when the bracket 76 is secured to the frame 32. A plenum support member 86 angles downwardly from a top portion 88 of the upright member 84 toward the center of the frame 32. In a preferred embodiment, the angle $\alpha$ of plenum support member 86 substantially approximates the angle of a surface 44 of a plenum section 38 to thereby allow each bracket 76 to securely engage a surface 44 of the plenum. Each bracket 76 is configured with a gusset 90 affixed between the upright member 84 and the support member 86 of each bracket 76 to thereby maintain the angle $\alpha$ between the upright member 84 and the support member 86.

It will be appreciated by those with skill in the art that the bracket 76 can be configured in a variety of ways to support an air plenum and still practice the teachings of this invention. In an alternative embodiment, a single bracket can be configured to replace the pair of brackets 76 of the present invention attached to opposing sides 30 of the frame 32. Of importance is that the brackets 76 are configured to support the plenum such that when the brackets 76 are attached to the frame 32, the belt 24 is supported in substantially the same position as the belt 24 was supported by the removed idler assemblies 12. For example, with reference to FIG. 4, the brackets 76 and the plenum sections 38 are configured such that when the air plenum is attached to the brackets 76, the belt 24, when positioned adjacent the parabolic air support surface 40, travels along substantially the same belt line relative to the frame 32 as the belt 24 traveled when supported by the removed idler assemblies 12. In other words, the bottom portion 55 of the air support surface 40 is substantially the same distance from the frame 32 as was the trough 20 when the idler assemblies 12 were attached to the frame 32. That distance being B (FIG. 2). Thus, the existing frame 32 can be used in the retrofitted conveyor as can other items of existing idler conveyor system. Accordingly, the advantages of an air plenum can be utilized without the expense of installing a completely new system.

In the preferred embodiment of the present invention, the base member 80, upright member 84, support member 86, and gusset 90 are made of 10 gauge carbon steel, one quarter of one inch thick. It will be appreciated these bracket parts may be made from a variety of materials including various metals, metal alloys, and composite materials. The materials may even vary for each of these parts.

The next step in retrofitting the idler assemblies 12 of an idler conveyor with an air plenum is to detach the belt 24. This can be done in a variety of ways including cutting the belt. It will be appreciated that with some idler conveyor configurations, the belt may only need to be loosened and not completely detached. The preselected number of idler assemblies 12 determined in the step of determining the number are then removed from the frame 32. One will appreciate that the removal process depends on the manner in which the idler assemblies 12 were attached to the frame 32.

Referring now to FIG. 7, a plurality of bracket pairs 76 are attached to the frame 32. One of each pair of brackets 76 is attached to a first side 30 of the frame 32 and the other one of each pair of brackets 76 being attached to a second side 30 of the frame 32, each bracket 76 of each pair of brackets 76 being attached to the frame 32 opposite the other. As discussed above, in an alternative embodiment, the ends of a single bracket may span the frame 32. Each pair of brackets 76 is spaced at an interval of between about 10 feet and about 60 feet along the frame 32 and preferably between about 30 feet and about 45 feet along the frame 32. The V-shaped air plenum of the present invention, because of its reduced weight and increased stability, can span greater distances than other types of plenums. This spanning capability allows for a reduction in the cost of construction and installation of additional brackets 76; a savings that is significant given that conveyors can be hundreds and even thousands of feet long.

In a presently preferred embodiment, the brackets 76 are attached to the frame 32 using the means of attachment used to attach the removed idler assemblies 12 to the frame 32. Where the idler assemblies 12 were bolted to the frame 32, the brackets 76 are attached to the frame 32 using the mounting holes left vacant by the bolts used to secure the removed idler assemblies 12 to the frame 32. It will be appreciated that in alternative embodiments, the brackets 76 may be riveted, welded, or otherwise secured to the frame 32, however, an advantage of the method of the present invention is to be able to use the bolt holes, if any, already existing in the frame 32 to thus make retrofitting the idler assemblies 12 more cost-effective.

The next step in the method of the present invention is to preassemble portions of the plenum and secure them to the frame. A plurality of plenum sections 38 are preassembled into at least one plenum subsection 96. Each plenum section 38 is attached end-to-end to an adjacent plenum section 38 with the end flanges 58 of adjacent plenum sections 38 being bolted together. It will be appreciated by those with skill in the art that the end flanges 58 can be secured together in a variety of ways with a variety different fasteners.

In one embodiment, a seal is applied between the end flanges 58 of adjacent plenum sections before the end flanges are bolted together. In a preferred embodiment, a silicon substance is applied to the end flanges 58 such that adjacent plenum sections 38 are separated by an air tight seam. It will be appreciated by those with skill in the art that a variety of materials may be used to attach and seal adjacent plenum sections 38 together including plastics and rubbers. The plenum sections 38 may also be seam welded together to created the substantially air tight seam. It will also be appreciated that air flow control is easier to achieve if the air is not allowed to escape through the seams of the plenum, but rather must escape through the openings 57 in the air support surface 40.

In the preassembling step of the preferred embodiment, the plenum subsections 96 are between about 20 feet and about 50 feet. It will be appreciated by those with skill in the art that the length of each plenum subsection 96 is in part dependent upon the strength of plenum materials used and the spanning capability of the plenum. The plenum subsection 96 must be able to support its own weight when being lifted into position to be secured to the brackets 76. With the inherent strength of the V-shape design a larger plenum subsection 96 may be preassembled and lifted than can be assembled with other plenum designs. The position and location of the existing idler conveyor also factors into the desired length of the plenum subsection 96. If the plenum is in a high wind area or there are many obstructions such as trees immediately adjacent the frame 32, smaller plenum subsections 96 may be desirable.

One with skill in the art will appreciate that the idler conveyor to be retrofitted may by elevated and may not provide substantial room to secure an air plenum to the existing frame 32. Thus, preassembling on the ground provides a safe and efficient way to assemble the plenum. It will also be appreciated by those with skill in the art that the plenum sections 38 can be secured to the brackets 76 of the frame 32 directly without the preassembling the sections 38 into plenum subsections 96.

Referring now to FIG. 8, means for securing the plenum to the brackets 76 is shown. In a presently preferred embodiment, a plurality of holes 98 are drilled into the plenum subsection 96. Each hole 98 aligns with a hole 100 in one of the brackets 76. A threaded sleeve 102 is then inserted into each hole 98 in the plenum subsection 96 for receiving a fastener 104. In the preferred embodiment, a bolt 104 is used to secure the plenum subsection 96 to the bracket 76. When the bolt 104 is threaded into the sleeve 102, the sleeve collapses around the hole 98. Thus, the sleeve and the bolt 104 substantially seal the hole 98 in the plenum subsection 96 thereby substantially preventing any air from escaping through the hole 98. Threaded sleeves 100 with fasteners 104 are commercially available. One such device is called the Nutsert.

It will be appreciated by those with skill in the art that a variety of means could be used to secure the plenum subsection 96 to the bracket 76. These include welding the plenum subsection 96 directly to the bracket 76.

Referring now to FIG. 7, the preassembling step and the securing step are repeated until the desired length of plenum is secured to the brackets 76 to thereby replace the preselected number of idler assemblies 12 removed in the removing step. As adjacent plenum subsections 96 are secured to the brackets 76, an end 106 of each plenum subsection 96 is attached to an end 106 of each adjacent plenum subsection 96 in the same way that the plenum sections were attached end-to-end. Thus, there is a substantially air tight seam between adjacent plenum subsections 96.

The next step in the method of retrofitting the idler assemblies 12 of an idler conveyor with an air plenum is to cap a first end 110 and a second end (not shown) of the air plenum with an end cap 112, thus making the ends 110 of the plenum substantially air tight. In a preferred embodiment, the end cap 112 is configured to bolt to the end flange 58 of the plenum section 38 located at each end 110 of the plenum.

The air plenum is configured with at least one compartment (not shown) that is at most 1000 feet long and preferably at most 650 feet long. Thus, if the desired number of idler assemblies 12 to be retrofitted with an air plenum corresponds to a length of greater than about 650 feet, the plenum subsection 96 corresponding to the plenum at about 650 feet will be capped off during the preassembly or securing step. When this plenum subsection 96 is attached to the brackets 76 and to the adjacent plenum subsection 96 already secured to the brackets 76, a substantially air tight compartment of about 650 feet will have been formed. The next plenum subsection 96 to be secured to the brackets 76 will have and end cap 112 and will start a second compartment of the air plenum. Accordingly, the air plenum is capped at about every 650 feet. In presently preferred embodiment, a single end cap 112 positioned between adjacent compartments is used to enclose the adjacent ends of the compartments.

It will be appreciated by those with skill in the art that a particular air plenum may be compartmented in a variety of ways and at a variety of lengths depending on the amount of air pressure desired in the compartment, the air source being used, and the air efficiencies of the plenum. For example, if a 2000 foot plenum is desired, one air source may not be able to provide the pressure needed across the entire length of the plenum. At this length, the pressure and/or volume of air near the air source may be slightly different than the pressure and/or volume of air an a far end of the plenum. Those with skill in the art will appreciate that by compartmenting the air plenum, the air pressure and volume will more likely be equal throughout the entire length of the plenum.

An air source 114 is attached to each compartment of the plenum. Air sources are known in the art and are commercially available. In the presently preferred embodiment, if the compartment is longer than about three hundred feet long, the air source 114 is attached to the compartment adjacent a middle portion (not shown) of the compartment. One with skill in the art will appreciate that this placement equalizes the air efficiencies at each end of the compartment. The air source 114 is attached to each plenum compartment by cutting an opening the in the plenum compartment and sealing the air source to the opening. In a preferred embodiment, a plenum section 38 is configured with an air source attachment opening.

It will be appreciated that inert gasses other than air can be used in the plenum. In some applications such as grain conveyance, an inert gas without oxygen may be safer to use given the sometimes volatile nature of certain materials.

The belt 24 is then reattached such that a portion of the continuous belt 24 is supported by the plenum with the belt 24 adjacent the air support surface 40. It will be appreciated that a new belt may be attached about the air plenum.

Referring to FIG. 7, an air plenum conveyor 120 of the present invention is shown. The air plenum conveyor 120 includes a frame 32. In a presently preferred embodiment, the frame 32 includes two parallel beams 122. A plurality of bracket pairs 76 are attached to the frame 32 at spaced intervals of between about 10 feet and about 60 feet and preferably at intervals of between about 30 feet and about 45 feet along the frame 32. One of each pair of brackets 76 is attached to each beam 122 of the frame 32. The brackets 76 are discussed in detail above in conjunction with FIGS. 5 and 6.

At least one hollow plenum is secured to the brackets 76. The plenum is made up of a plurality of plenum sections 38. The plenum section 38 of the preferred embodiment is discussed in detail above in conjunction with FIG. 4. The plenum is compartmented with at least one compartment of at most 650 feet. As discussed previously, each compartment is configured with an end cap 112 at a first end 110 and a second end (not shown). Each plenum compartment is substantially air tight. As discussed in conjunction with FIG. 4 above, the plenum includes means for attaching a cover. The means includes a side flange 68 extending from a first edge 52 of the air support surface 40 and a side flange 68 extending from a second edge 54 of the air support surface 40. The side flanges 68 extend outwardly from the open end 50 of the bottom member 48 on each side of the open end 50.

As discussed above, the plenum of the present invention is secured to each bracket 76 by means of a fastener 104 positioned through a hole 100 in the bracket 76 and through a corresponding hole 98 in the plenum 96 adjacent the hole 100 in the bracket 76. In a preferred embodiment a threaded sleeve 102 is positioned within each hole 98 in the plenum such that when the fastener 104 is positioned within the sleeve 102, the sleeve 102 and the fastener 104 substantially seal the hole 98 in the plenum to thereby prevent air from escaping out of the hole 98.

Referring to FIG. 7, and as also discussed above, an air source 114 is attached to each plenum compartment of the air plenum conveyor. If the compartment is longer than about three hundred feet, the air source is attached to the compartment adjacent a middle portion of the compartment.

The air plenum conveyor 120 includes a continuous belt 24 positioned about and supported by the plenum. In one presently preferred embodiment, the belt is a troughing belt 24 configured to conform to the shape of the parabolic air support surface 40.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of retrofitting the idler assemblies of an idler conveyor with an air plenum, the idler assemblies being mounted to a frame with a continuous belt positioned about the idler assemblies, comprising the steps of:

detaching the belt;

removing a preselected number of idler assemblies from the frame of the idler conveyor;

attaching means for supporting an air plenum to the frame;

securing an air plenum to the means for supporting the air plenum;

attaching an air source to the plenum; and reattaching the belt such that a portion of the continuous belt is supported by the plenum.

2. The method of claim 1, wherein the means for supporting an air plenum to the frame utilizes a plurality of mounting holes left vacant in the frame by the removed idler assemblies.

3. The method of claim 1, wherein the means for supporting an air plenum comprises a plurality of bracket pairs attached at spaced intervals along the frame, the bracket pairs being configured to receive an air plenum.

4. The method of claim 3, wherein one of each pair of brackets is attached to a first side of the frame and the other one of each pair of brackets is attached to a second side of the frame, each bracket of each pair of brackets being attached to the frame opposite each other.

5. The method of claim 3, wherein each pair of brackets is spaced at an interval of between about 10 feet and about 60 feet.

6. The method of claim 5, wherein each pair of brackets is spaced at an interval of between about 30 feet and about 45 feet.

7. The method of claim 1, wherein the plenum is configured with a parabolic air support surface and a V-shaped bottom member, the V-shaped bottom member having a pair of surfaces attached along a first edge of each surface, a second edge of each surface defining an open end of the V-shaped bottom member, the parabolic support surface positioned substantially within and engaging the open end of the V-shaped bottom member to thereby create a substantially air tight seam along the second edge of each surface defining the open end.

8. The method of claim 7, wherein each removed idler assembly comprises a plurality of rolls, each roll configured with a contact side for supporting the belt, the contact sides of the rolls in the idler assemblies defining a trough in which the belt travels, and wherein the parabolic air support surface is configured to approximate the trough.

9. The method of claim 7, wherein the plenum and the means for supporting the plenum are configured such that when the plenum is attached to said means, the belt, when positioned adjacent the parabolic air support surface, travels along substantially the same belt line relative to the frame as the belt traveled when supported by the removed idler assemblies.

10. The method of claim 1, further comprising the step of affixing an end cap to a first end and a second end of the plenum to thereby enclose the plenum such that the ends of the plenum are substantially air tight.

11. A method of retrofitting the idler assemblies of an idler conveyor with an air plenum, the idler assemblies being mounted to a frame with a continuous belt positioned about the idler assemblies, each idler assembly having a plurality of rolls defining a support trough in which the load bearing portion of the continuous belt rests, the method comprising the steps of:

detaching the conveyor belt;

removing a preselected number of idler assemblies from the frame of the idler conveyor;

attaching a plurality of bracket pairs to the frame, one of each pair of brackets being attached to a first side of the frame and the other one of each pair of brackets being attached to a second side of the frame, each bracket of each pair of brackets being attached to the frame opposite the other, each pair of brackets being spaced at an interval of between about 10 feet and about 60 feet along the frame, each bracket being configured with means for mounting the bracket to the frame, each bracket pair being configured to receive an air plenum;

securing an air plenum to the brackets, the air plenum comprising a parabolic air support surface, said support surface being configured to approximate the trough defined by the rolls of the idler assemblies, the plenum and brackets being configured such that when the plenum is attached to the brackets, the belt, when positioned adjacent the parabolic air support surface, travels along substantially the same belt line relative to the frame as the belt traveled when supported by the removed idler assemblies;

capping a first end and a second end of the plenum;

attaching an air source to the plenum; and reattaching the belt such that a portion of the continuous belt is supported by the plenum.

12. The method of claim 11, wherein each pair of brackets is spaced at an interval of between about 30 feet and about 45 feet.

13. The method of claim 11, wherein each idler assembly is configured with at least one mounting notch to facilitate securing the idler assembly to the frame with a fastener positioned within the idler assembly mounting notch and within a hole in the frame and wherein the means for attaching each bracket to the frame comprises at least one mounting notch, the mounting notch being configured to conform to the dimensions of the mounting notch of the idler assembly to thereby allow each bracket to be attached to the frame using the holes left vacant by the fasteners used to secure the removed idler assemblies to the frame.

14. The method of claim 11, wherein the securing step comprises:

drilling a plurality of holes into the plenum, each hole aligning with a hole in one of the brackets;

inserting a threaded sleeve into each hole in the plenum for receiving a fastener; and threading a fastener into the hole in the bracket and into the sleeve in the plenum subsection to thereby secure the plenum subsection to the bracket, the sleeve and the fastener substantially sealing the hole in the plenum subsection.

15. The method of claim 11, wherein the plenum comprises at least one substantially air tight compartment, each compartment being at most about 1000 feet.

16. The method of claim 15, wherein each air tight compartment is at most about 650 feet.

17. The method of claim 15, wherein the step of attaching an air source comprises attaching an air source to each compartment.

18. The method of claim 11, wherein the plenum comprises a plurality of plenum sections of between about 5 feet and about 25 feet in length, each plenum section being attached end-to-end with each adjacent plenum section.

19. The method of claim 18, wherein each plenum section is between about 8 feet and about 12 feet in length.

20. The method of claim 18, wherein the step of securing the plenum is preceded by the step of preassembling a plurality of plenum sections to form a plenum subsection of between about 20 feet and about 50 feet, each plenum section being attached end-to-end with each adjacent plenum section.

21. The method of claim 20, wherein an end flange is attached to each end of each plenum section to thereby facilitate the end-to-end attachment of adjacent plenum sections.

22. The method of claim 21, wherein the step of preassembling further comprises applying a seal between the end flanges of adjacent plenum sections before bolting together the end flanges to thereby create a substantially air tight seam between the adjacent plenum sections.

23. The method of claim 20, wherein the securing step comprises securing a plenum subsection to the brackets.

24. The method of claim 23, wherein the steps of preassembling and securing are repeated until the desired length of plenum is secured to the brackets to thereby replace the preselected number of idler assemblies removed in the removing step, an end of each plenum subsection being attached to an end of each adjacent plenum subsection to thereby created a substantially air tight seam between adjacent plenum subsections.

25. A method of retrofitting the idler assemblies of an idler conveyor with an air plenum, the idler assemblies being mounted to a frame with a continuous troughing belt positioned about the idler assemblies, each idler assembly having a plurality of rolls, including a pair of angled end rolls, defining a support trough in which a load bearing portion of the continuous belt rests, the rolls being attached to a base, the base configured with at least one mounting notch disposed within a first end and a second end of the base to facilitate securing the idler assembly to the frame with a fastener positioned within the idler assembly mounting notch and within a hole in the frame, the method comprising the steps of:

- determining the number of idler assemblies to be retrofitted with the air plenum;
- identifying the width of the troughing belt used with the idler assemblies to be retrofitted, the angle of the end rolls of the idler assemblies to be retrofitted, the CEMA idler classification for the idler assemblies to be retrofitted, and whether idler assemblies to be retrofitted include a wide base or a standard base;
- determining the width and depth of the trough and the position of the trough relative to the frame for the particular type of idler assemblies identified in the previous step;
- determining the distance between the mounting notches configured within the base of the idler assemblies identified in the identifying step;
- manufacturing a plurality of plenum sections each comprising an air support surface sealed to a bottom member, the air support surface configured with a plurality of openings to thereby permit air passing through the plenum section to escape through the air support surface, the air support surface being configured to approximate the trough according to the trough dimensions determined in the step of determining the width and length of the trough;
- manufacturing brackets to support the plenum, each bracket being configured to attach to a first side and second side of the frame and to engage a surface of the bottom member of the plenum such that when the plenum is attached to the brackets, the belt, when positioned adjacent the parabolic air support surface, travels along substantially the same belt line relative to the frame as the belt traveled when supported by the removed idler assemblies, each bracket being configured with means for mounting the bracket to the frame;
- detaching the troughing belt;
- removing a preselected number of idler assemblies from the frame;
- attaching a plurality of bracket pairs to the frame, one of each pair of brackets being attached to a first side of the frame and the other one of each pair of brackets being attached to a second side of the frame, each bracket of each pair of brackets being attached to the frame opposite the other, each pair of brackets being spaced at an interval of between about 30 feet and about 45 feet along the frame;
- preassembling a plurality of plenum sections into at least one plenum subsection, each plenum section being attached end-to-end to an adjacent plenum section to thereby create a substantially air tight seam between adjacent plenum sections;
- securing each preassembled plenum subsection of plenum to the brackets;
- repeating the preassembling step and the securing step until the length of the idler conveyor corresponding to the number of idler assemblies to be retrofitted, as determined in the determining the number step, has been spanned by an air plenum, the seams between adjacent plenum sections being substantially air tight;
- capping a first end and a second end of the air plenum to thereby make the ends of the plenum substantially air tight;
- attaching an air source to the plenum; and
- reattaching the belt such that a portion of the continuous belt is supported by the plenum.

26. The method of claim 25, wherein the means for attaching each bracket to the frame comprises at least one mounting notch, the mounting notch being configured to conform to the dimensions of the mounting notch of the idler assembly to thereby allow each bracket to be attached to the frame using the holes left vacant by the fasteners used to secure the removed idler assemblies to the frame.

27. The method of claim 25, wherein the securing step comprises:

- drilling a plurality of holes into the plenum subsection, each hole aligning with a hole in one of the brackets;
- inserting a threaded sleeve into each hole in the plenum subsection for receiving a fastener; and
- threading a fastener into the hole in the bracket and into the sleeve in the plenum subsection to thereby secure the plenum subsection to the bracket, the sleeve and the fastener substantially sealing the hole in the plenum subsection.

28. The method of claim 25, wherein the air plenum is configured with at least one compartment, each compartment being at most 650 feet.

29. The method of claim 28, wherein the attaching an air source step comprises attaching an air source to each compartment.

30. The method of claim 28, wherein if the compartment is longer than about three hundred feet long, the attaching an air source step comprises attaching an air source to the compartment adjacent a middle portion of the compartment.

31. An air conveyor, comprising:

a frame;

a plurality of bracket pairs attached to the frame at spaced intervals of between about 30 feet and about 45 feet along the frame, one of each pair of brackets being attached to a first side of the frame and the other one of each pair of brackets being attached to a second side of the frame, each bracket of each pair of brackets being attached to the frame opposite the other, each bracket being configured with a base member for attaching the bracket to the frame, the base member being configured with a pair of mounting notches disposed within opposite edges of the base member, the notches being spaced at a distance of between about 5 inches and about 10 inches apart;

at least one V-shaped plenum secured to the brackets, the plenum comprising a plurality of plenum sections of between about 8 feet and about 12 feet in length, the plenum sections being attached end-to-end to form at least one substantially hollow plenum compartment of at most 650 feet, each compartment having a first end and a second end, each end enclosed with an end cap, each plenum compartment being substantially air tight, the plenum comprising a V-shaped bottom member and a parabolic air support surface positioned within an open end of the V-shaped bottom member and attached to the open end of the V-shaped bottom member, the parabolic air support surface being configured with a plurality of opening to permit air passing through the plenum to escape through the air support surface, a side flange extending from a first edge of the air support surface and a side flange extending from a second edge of the air support surface, the side flanges extending outwardly from the open end of the V-shaped bottom member on each side of the open end to thereby permit the attachment of a cover to the plenum;

an air source attached to each plenum compartment; and a continuous troughing belt configured to conform to the shape of the parabolic air support surface, the troughing belt positioned about and supported by the plenum.

32. An air conveyor, comprising:

a frame;

a plurality of bracket pairs attached to the frame at spaced intervals along the frame;

a V-shaped plenum secured to the brackets. wherein the plenum comprises a plurality of plenum sections of between about 5 feet and about 25 feet in length, each plenum section being attached end-to-end with each adjacent plenum section to thereby create a substantially air tight seam between the adjacent plenum sections;

an air source attached to the plenum; and a continuous belt positioned about and supported by the plenum.

33. The conveyor of claim 32, wherein one of each pair of brackets is attached to a first side of the frame and the other one of each pair of brackets is attached to a second side of the frame, each bracket of each pair of brackets being attached to the frame opposite the other, each pair of brackets being spaced at an interval of between about 10 feet and about 60 feet along the frame.

34. The conveyor of claim 32, wherein each pair of brackets is spaced at an interval of between about 30 feet and about 45 feet.

35. The conveyor of claim 32, wherein each bracket has a base member for attaching the bracket to the frame, the base member being configured with at least one mounting notch to thereby facilitate the mounting of the bracket to the frame.

36. The conveyor of claim 35, wherein the base member is configured with a pair of notches disposed within opposite edges of the base member, the notches being spaced at a distance of between about 5 inches and about 10 inches apart.

37. The conveyor of claim 35, wherein each bracket is configured with an upright member attached to the base member and extending upwardly away from the base member when the bracket is secured to the frame, and wherein a plenum support member angles downwardly from a top portion of the upright member toward the center of the frame to thereby allow each bracket to engage a surface of the V-shaped plenum, and wherein a gusset is affixed between the upright member and the support member of each bracket to thereby maintain the angle between the upright member and the support member.

38. The conveyor of claim 32, wherein each plenum section is between about 8 feet and about 12 feet in length.

39. The conveyor of claim 32, wherein an end flange is attached to each end of each plenum section to thereby facilitate the end-to-end attachment of adjacent plenum sections.

40. The conveyor of claim 32, wherein each plenum section comprises a parabolic air support surface and a V-shaped bottom member, the V-shaped bottom member having a pair of surfaces attached along a first edge of each surface, a second edge of each surface defining an open end of the V-shaped bottom member, the parabolic support surface positioned substantially within the open end and engaging the open end of the V-shaped bottom member to thereby create a substantially air tight seam along the second edge of each surface defining the open end, the parabolic air support surface being configured with a plurality of openings disposed therethrough to thereby permit air passing within the plenum to escape through the parabolic air support surface thus forming an air cushion adjacent the air support surface on which the belt may ride.

41. The conveyor of claim 40, wherein a side flange extends from a first edge of the air support surface and a side flange extends from a second edge of the air support surface, the side flanges extending outwardly from the open end of the V-shaped bottom member on each side of the open end to thereby permit the attachment of a cover to the plenum.

42. The conveyor of claim 32, wherein an end cap is attached to a first end and a second end of the plenum to thereby enclose the plenum, the ends of the plenum being substantially air tight.

43. The conveyor of claim 32, wherein the plenum comprises at least one compartment, each compartment being at most about 1000 feet.

44. The conveyor of claim 43, wherein each compartment is at most about 650 feet.

45. The conveyor of claim 43, wherein an air source is attached to each compartment.

46. The conveyor of claim 45, wherein if the compartment is longer than about three hundred feet long, the air source is attached to the compartment adjacent a middle portion of the compartment.

47. The conveyor of claim 32, wherein the plenum is secured to the brackets by means of a fastener positioned through a hole in each bracket and through a corresponding hole in the plenum adjacent the hole in the bracket.

48. The conveyor of claim 47, wherein a threaded sleeve for receiving the fastener is positioned within each hole in the plenum such that when the fastener is positioned within the sleeve in the plenum, the sleeve and the fastener substantially seal the hole in the plenum to thereby prevent air from escaping out of the hole.

* * * * *